US012676443B2

(12) United States Patent
Trotman et al.

(10) Patent No.: US 12,676,443 B2
(45) Date of Patent: Jul. 7, 2026

(54) INTEGRATED SCALABLE CONNECTOR PIN FIELD EMI SHIELDING ASSEMBLY AND A METHOD FOR IMPLEMENTING SAME

(71) Applicant: Hamilton Sundstrand Corporation, Charlotte, NC (US)

(72) Inventors: Alexander Trotman, Granby, CT (US); Katherine Jeanne Novak, East Longmeadow, MA (US)

(73) Assignee: HAMILTON SUNDSTRAND CORPORATION, Charoltte, NC (US)

( * ) Notice: Subject to any disclaimer, the term of this patent is extended or adjusted under 35 U.S.C. 154(b) by 464 days.

(21) Appl. No.: 18/342,432

(22) Filed: Jun. 27, 2023

(65) Prior Publication Data

US 2025/0007221 A1 Jan. 2, 2025

(51) Int. Cl.

| | |
|---|---|
| ***H01R 12/00*** | (2006.01) |
| ***H01R 12/71*** | (2011.01) |
| ***H01R 13/6587*** | (2011.01) |
| *H01R 13/621* | (2006.01) |

(52) U.S. Cl.

CPC ....... *H01R 13/6587* (2013.01); *H01R 12/716* (2013.01); *H01R 13/6215* (2013.01)

(58) Field of Classification Search

CPC .............. H01R 13/6587; H01R 12/716; H01R 13/6215; H05K 9/0026

See application file for complete search history.

(56) References Cited

U.S. PATENT DOCUMENTS

| | | | | |
|---|---|---|---|---|
| 5,639,989 | A | 6/1997 | Higgins, III | |
| 5,792,994 | A | 8/1998 | Akahane | |
| 5,823,826 | A * | 10/1998 | Ward | H01R 13/7195 439/620.11 |
| 6,094,361 | A | 7/2000 | Batten, Jr. et al. | |
| 6,206,728 | B1 * | 3/2001 | Krehbiel | H05K 9/0018 439/939 |
| 6,551,134 | B1 * | 4/2003 | Yunker | G02B 6/4201 439/71 |
| 8,294,043 | B2 * | 10/2012 | Munoz | H01R 13/6595 439/607.14 |
| 8,337,232 | B2 | 12/2012 | Chang | |

(Continued)

FOREIGN PATENT DOCUMENTS

| | | |
|---|---|---|
| CN | 108711697 A | 10/2018 |
| EP | 1033787 A1 | 9/2000 |

OTHER PUBLICATIONS

Extended European Search Report for EP Application No. 24182536.3, dated Nov. 15, 2024, pp. 1-15.

*Primary Examiner* — Abdullah A Riyami
*Assistant Examiner* — Nelson R. Burgos-Guntin
(74) *Attorney, Agent, or Firm* — CANTOR COLBURN LLP

(57) ABSTRACT

An Electromagnetic Interference (EMI) Shielding Assembly (EISA) for a PCBA is provided and includes an enclosure, wherein the enclosure defines an enclosure cavity and an electrically conductive foundation associated with a PCBA having an area of interest, wherein the electrically conductive foundation at least partially surrounds the area of interest, and wherein the enclosure is securely connected to the PCBA to completely cover the area of interest and to contact the electrically conductive foundation.

18 Claims, 9 Drawing Sheets

(56) References Cited

U.S. PATENT DOCUMENTS

| | | | | |
|---|---|---|---|---|
| 9,178,318 | B2 | 11/2015 | Rascon et al. | |
| 9,368,930 | B2 | 6/2016 | Smith et al. | |
| 10,686,282 | B1 * | 6/2020 | McCarthy | H01R 13/6471 |
| 11,363,746 | B2 * | 6/2022 | Valiente | H05K 1/0242 |
| 2004/0196642 | A1 * | 10/2004 | Aronson | G02B 6/4201 361/753 |
| 2011/0014800 | A1 * | 1/2011 | Cheng | H01R 12/716 439/55 |
| 2016/0093966 | A1 * | 3/2016 | Behziz | H05K 1/0219 439/607.28 |
| 2018/0269633 | A1 * | 9/2018 | Rascon | H01R 12/724 |

* cited by examiner

INTEGRATED SCALABLE CONNECTOR PIN FIELD EMI SHIELDING ASSEMBLY AND A METHOD FOR IMPLEMENTING SAME

TECHNICAL FIELD

The present disclosure relates to an Electromagnetic Interference (EMI) shield, and more particularly to an EMI shield assembly for a Printed Circuit Board Assembly (PCBA).

BACKGROUND

Electromagnetic Interference (EMI) is any unwanted noise or interference in an electrical path or circuit caused by an electromagnetic field generated from an outside source. EMI can be caused by natural events, man-made sources and inherent sources. Natural events (e.g., solar flares, lightning storms) can cause EMI to occur in electronic devices due to bombardment of highly charged particles (solar flares) or strong electrostatic discharges and magnetic pulses (lightning storms). Man-made EMI is typically caused by man-made devices, equipment and structures such as communication towers, high-voltage power lines, radar systems and other electronic equipment (such as microwave devices, cell phones, etc.).

On the other hand, inherent EMI is typically caused by a device's own internal components which can radiate energy that causes interference with other internal components. And as electronics become smaller, faster and the components are more tightly packed together, this problem is exacerbated in that the electronics are more sensitive and more susceptible to the effects of EMI. In the electronics design industry, the threat of EMI to the health of a Printed Circuit Board Assembly (PCBA) and its onboard circuitry can be critical. For more complex electronic assemblies such as critical flight and engine controls, prevention and/or mitigation of EMI effects is especially important due to the critical functional requirements of these designs/components. In fact, failure of a mission critical component can result in the loss of aircraft and/or a life. Unfortunately, however, within these assemblies, design restrictions sometimes do not allow for the full separation or encapsulation of EMI-radiating areas to shield nearby EMI-sensitive circuitry.

Historically, EMI shielding has been achieved by using covers, tapes and/or frames/heatsinks to encapsulate the radiating component, circuit or PCBA. These design solutions help to keep the radiating areas from affecting nearby EMI-sensitive circuitry. One example of a common EMI shielding approach is used for a PCBA when a connector, such as a MIL-DTL-38999 connector (See FIG. 1A and FIG. 1B), is associated with a PCBA. In this case, the pins on the connector are disposed within via holes defined by the PCBA and soldered in place to secure the connector to the PCBA and to connect each of the pins to a component and/or circuit within the PCBA. As shown in FIG. 1C and FIG. 1D, in this type of connection, the pins and/or solder joints are typically slightly protruding/raised from the via holes, and if the pins and/or solder joints are located proximate radiating components, they may be susceptible to EMI from those components. Referring to FIG. 1E, in order to minimize and/or prevent EMI, a frame/heatsink shield would be put in place to shield the radiating components and prevent them from generating EMI in proximately located components. Unfortunately, however, in certain situations, this type of shielding may not be achievable due to design constraints, such as the mounting and/or envelope restrictions imposed on the PCBA. In addition, the size of the sensitive area which needs to be protected from EMI is often quite small as compared to the size of the shielding required for the entire radiating component/circuitry/PCBA.

SUMMARY

An Electromagnetic Interference (EMI) Shielding Assembly (EISA) for a Printed Circuit Board Assembly (PCBA) is provided and includes an enclosure, wherein the enclosure defines an enclosure cavity and an electrically conductive foundation associated with PCBA having an area of interest, wherein the electrically conductive foundation at least partially surrounds the area of interest, and wherein the enclosure is securely connected to the PCBA to completely cover the area of interest and to contact the electrically conductive foundation.

In addition to one or more of the features described above, or as an alternative to any of the foregoing embodiments, the area of interest is contained within the enclosure cavity.

In addition to one or more of the features described above, or as an alternative to any of the foregoing embodiments, the enclosure is constructed from an electromagnetic shielding material.

In addition to one or more of the features described above, or as an alternative to any of the foregoing embodiments, the enclosure is constructed from a ferrite material.

In addition to one or more of the features described above, or as an alternative to any of the foregoing embodiments, the electrically conductive foundation includes a plurality of mounting surfaces located along a perimeter of the area of interest.

In addition to one or more of the features described above, or as an alternative to any of the foregoing embodiments, the electrically conductive foundation further includes at least one conductive metal trace which is located along the perimeter of the area of interest and which conductively connects the plurality of mounting surfaces.

In addition to one or more of the features described above, or as an alternative to any of the foregoing embodiments, at least one of the plurality of mounting surfaces is configured to be connected to a ground potential.

In addition to one or more of the features described above, or as an alternative to any of the foregoing embodiments, the area of interest is a connector pin field which includes at least one connector pin that protrudes from the PCBA.

In addition to one or more of the features described above, or as an alternative to any of the foregoing embodiments, the enclosure cavity includes a cavity height, a cavity width and a cavity length, wherein the cavity height, cavity width and cavity length are sized to completely enclose and contain the connector pin field.

An Electromagnetic Interference (EMI) Shielding Assembly (EISA) for a PCBA is provided and includes an enclosure, wherein the enclosure defines an enclosure cavity and a PCBA, wherein the PCBA includes a connector pin field which includes at least one connector pin and which is external to the PCBA, and an electrically conductive foundation associated with the PCBA to at least partially surround the connector pin field, wherein the enclosure is securely connected to the PCBA to contact the electrically conductive foundation and to completely contain the connector pin field within the enclosure cavity.

In addition to one or more of the features described above, or as an alternative to any of the foregoing embodiments, the enclosure is constructed from an electromagnetic shielding material.

In addition to one or more of the features described above, or as an alternative to any of the foregoing embodiments, the enclosure is constructed from a ferrite material.

In addition to one or more of the features described above, or as an alternative to any of the foregoing embodiments, the electrically conductive foundation includes a plurality of mounting surfaces located along a perimeter of the connector pin field.

In addition to one or more of the features described above, or as an alternative to any of the foregoing embodiments, the electrically conductive foundation further includes a plurality of conductive metal traces which are located along the perimeter of the connector pin field and which conductively connect the plurality of mounting surfaces.

In addition to one or more of the features described above, or as an alternative to any of the foregoing embodiments, at least one of the plurality of mounting surfaces is configured to be connected to a ground potential.

In addition to one or more of the features described above, or as an alternative to any of the foregoing embodiments, the connector pin field includes at least one connector pin that protrudes from the PCBA.

In addition to one or more of the features described above, or as an alternative to any of the foregoing embodiments, the enclosure cavity includes a cavity height, a cavity width and a cavity length, wherein the cavity height, cavity width and cavity length are sized to completely enclose and contain the connector pin field.

A method for shielding an area of interest on a PCBA from EMI, wherein the method includes identifying an area of interest on a PCBA design to be shielded from EMI, wherein the PCBA includes a conductive foundation configurable to a ground potential and surrounding the area of interest, locating a shielding enclosure on the PCBA to completely cover the area of interest and to be in contact with the conductive foundation and securing the shielding enclosure to the PCBA to electromagnetically seal the area of interest within the shielding enclosure.

In addition to one or more of the features described above, or as an alternative to any of the foregoing embodiments, the conductive foundation includes conductive mounting interfaces and, securing includes securing the shielding enclosure with at least one mounting device to be in contact with the conductive mounting interfaces.

In addition to one or more of the features described above, or as an alternative to any of the foregoing embodiments, the conductive foundation includes an electrically conductive trace which surrounds at least a portion of the area of interest.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the several Figures.

Figure 1A:
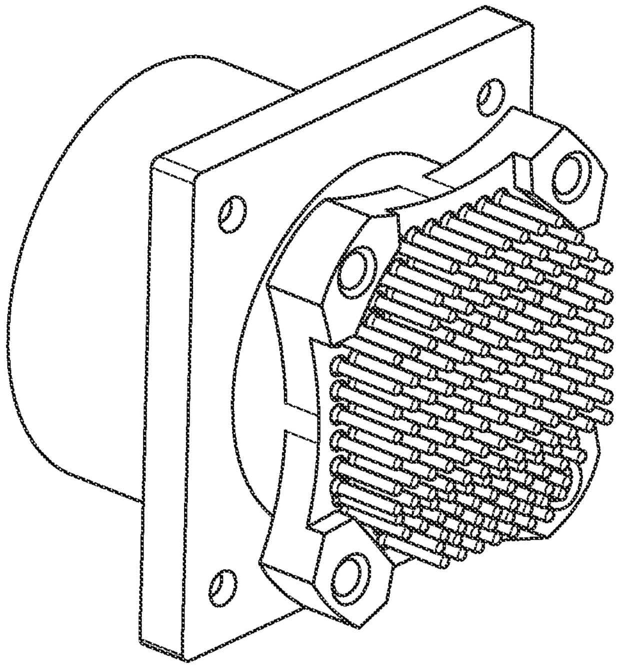
FIG. 1A (Prior Art)
FIG. 1A is a perspective view of a custom connector with mounting feet, in accordance with the prior art.
Figure 1B:
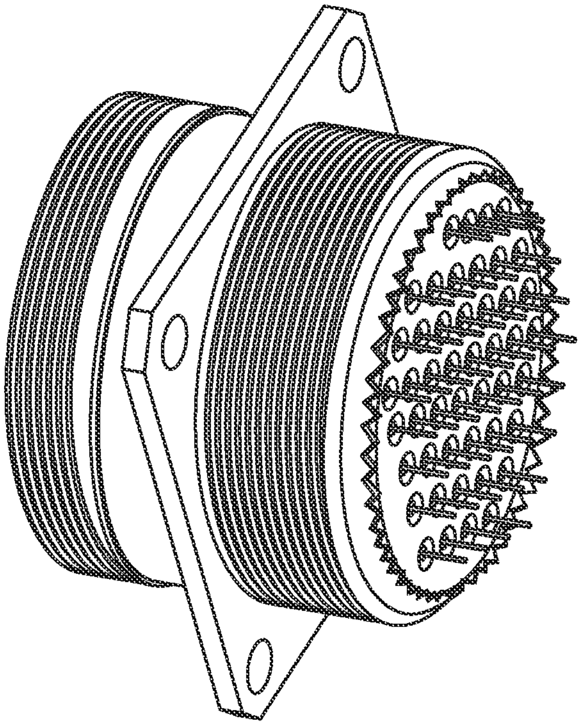
FIG. 1B (Prior Art)
FIG. 1B is a perspective view of a standard connector without mounting feet, in accordance with the prior art.
Figure 1C:
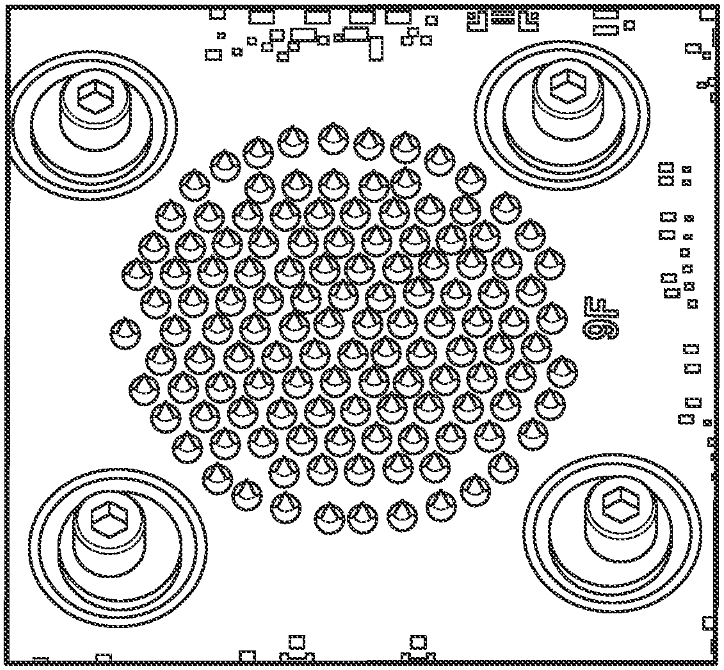
FIG. 1C (Prior Art)
FIG. 1C is a top down, side view of the connector of FIG. 1A mounted to a Printed Circuit Board (PCB) showing the exposed connector pin field, in accordance with the prior art.
Figure 1D:
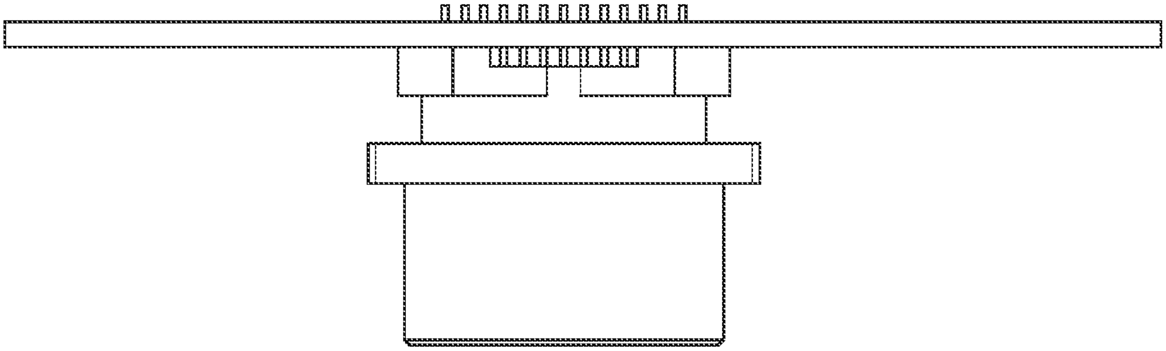
FIG. 1D (Prior Art)
FIG. 1D is a side view of the connector of FIG. 1A mounted to a PCB showing the exposed connector pin field, in accordance with the prior art.
Figure 1E:
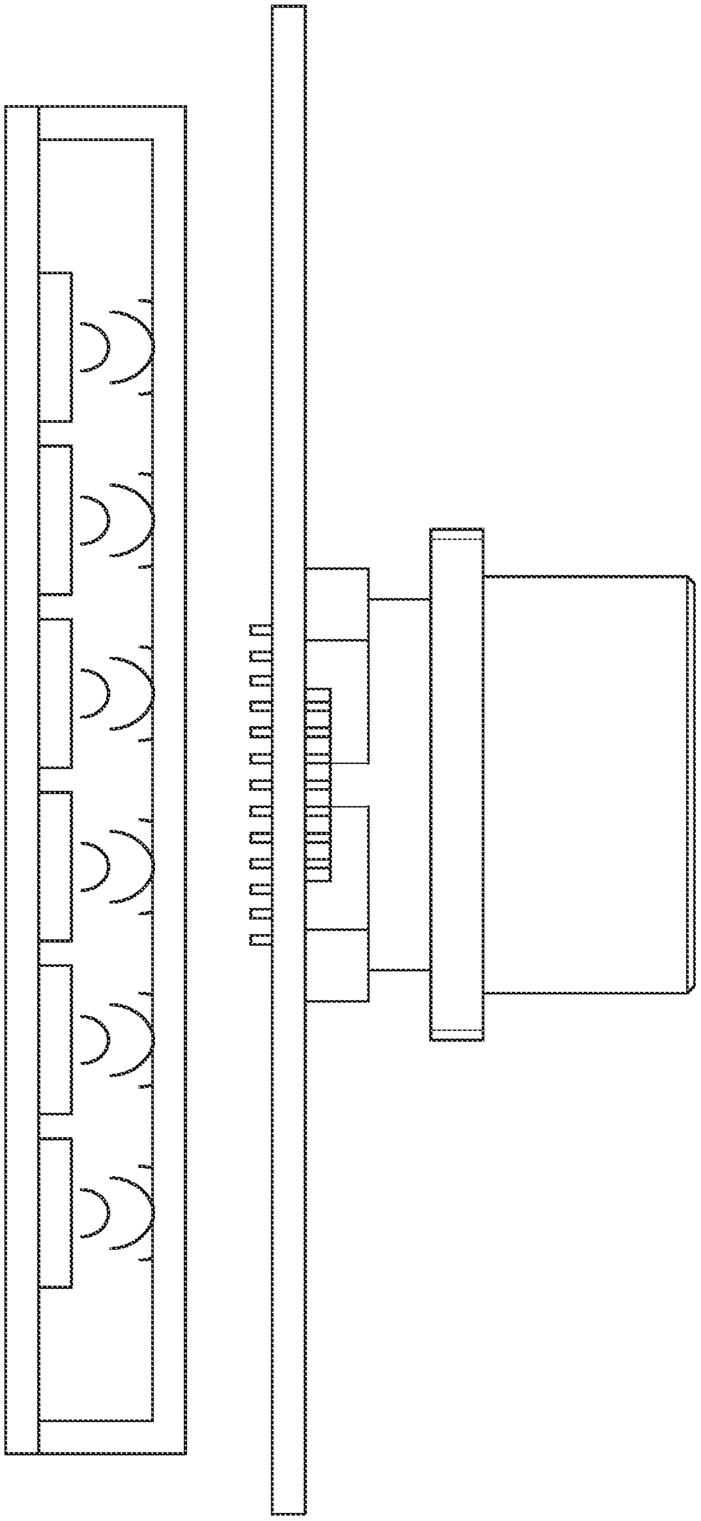
FIG. 1E (Prior Art)
FIG. 1E is a side view of the connector/combination of FIG. 1D and a second PCBA having shielded radiating components located proximate the exposed connector pin field, in accordance with the prior art.
Figure 2:
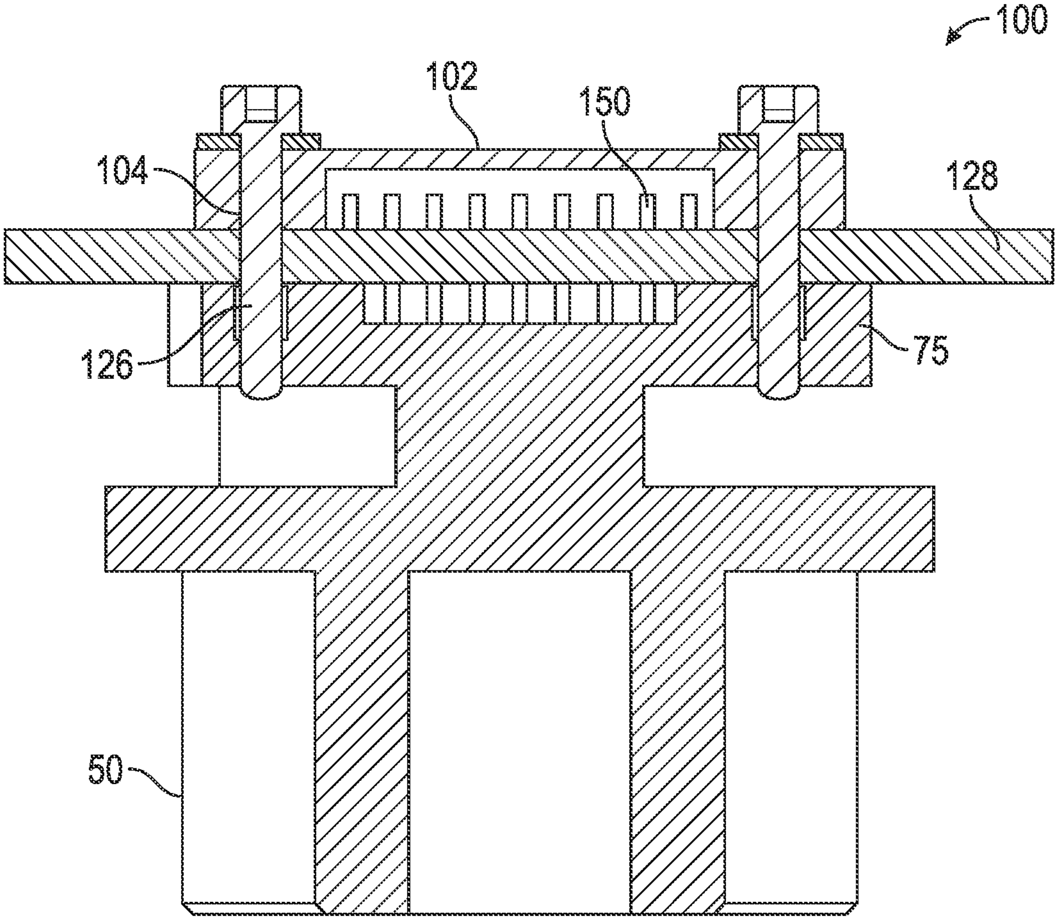
FIG. 2 is a side sectional view of a connector with mounting feet connected to a PCBA implementing the PCBA EMI shielding assembly, in accordance with an embodiment of the invention.
Figure 3A:
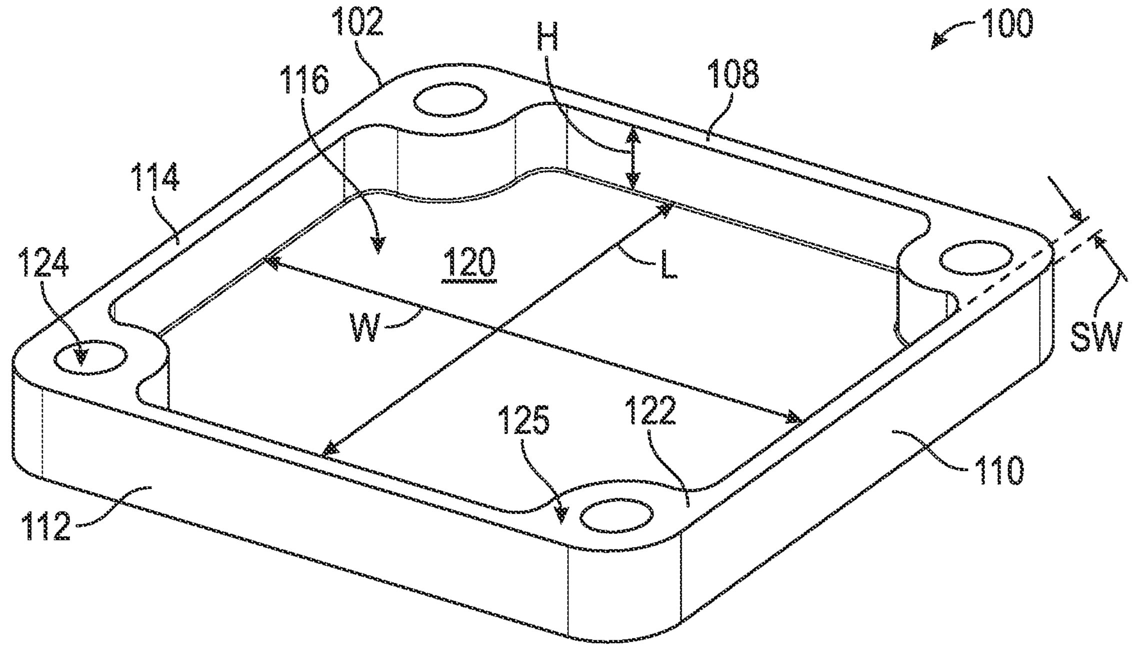
FIG. 3A is a bottom perspective view of an enclosure of the PCBA EMI shielding assembly of FIG. 2, in accordance with an embodiment of the invention.
Figure 3B:
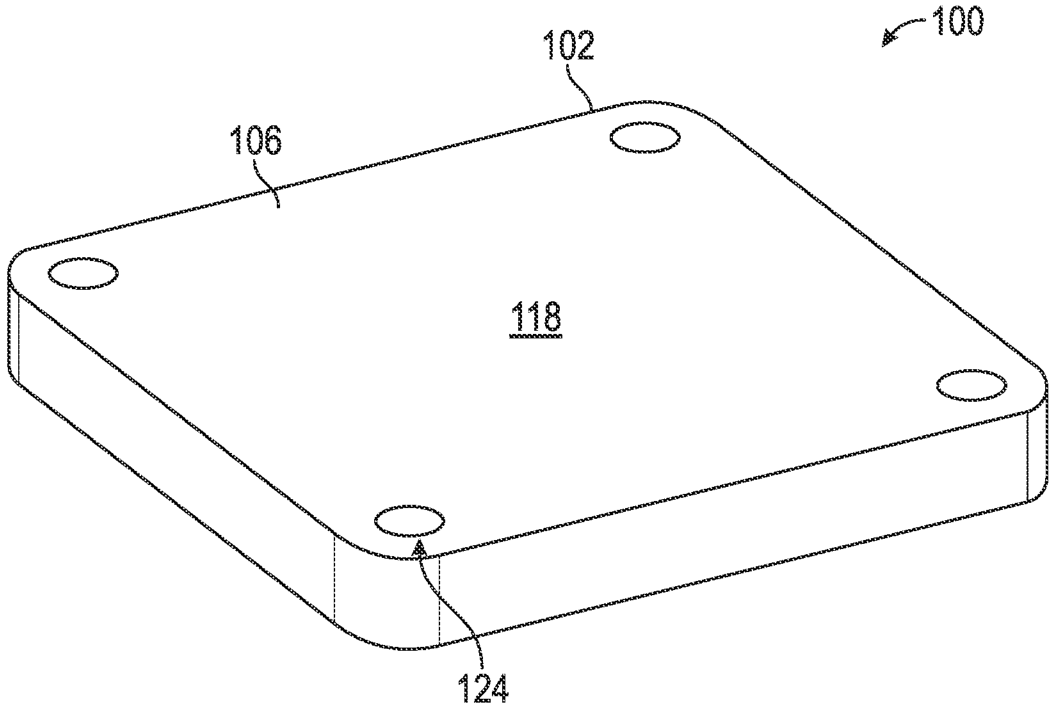
FIG. 3B is a top perspective view of an enclosure of the PCBA EMI shielding assembly of FIG. 2, in accordance with an embodiment of the invention.

Referring to FIG. 2, a PCBA EMI shielding assembly 100 having an enclosure 102 and an electrically conductive foundation 104 is shown being implemented with a connector 50 having mounting feet 75 and a PCBA 128 which is associated with the electrically conductive foundation 104, in accordance with an embodiment. Referring to FIG. 3A and FIG. 3B, the enclosure 102 includes a cover 106, a first sidewall 108, a second sidewall 110, a third sidewall 112 and a fourth sidewall 114 which define an enclosure cavity 116. The cover 106 includes a cover top surface 118 and a cover bottom surface 120, and each of the first sidewall 108, second sidewall 110, third sidewall 112 and fourth sidewall 114 include a sidewall bottom surface 122 having a sidewall width SW. The enclosure cavity 116 includes a cavity height H, a cavity width W and a cavity length L which is sized and shaped to cover and contain an area of interest on the PCBA 128, such as a connector pin field 150. The enclosure 102 further defines a plurality of enclosure mounting cavities 124 which are surrounded by enclosure interface surfaces 125 located in each corner of the enclosure 102 and which communicate the cover top surface 118 with the sidewall bottom surface 122. Each of the enclosure mounting cavities

124 are sized and shaped to contain a mounting device 126, such as a mounting screw (See FIG. 2).

Figure 4A:
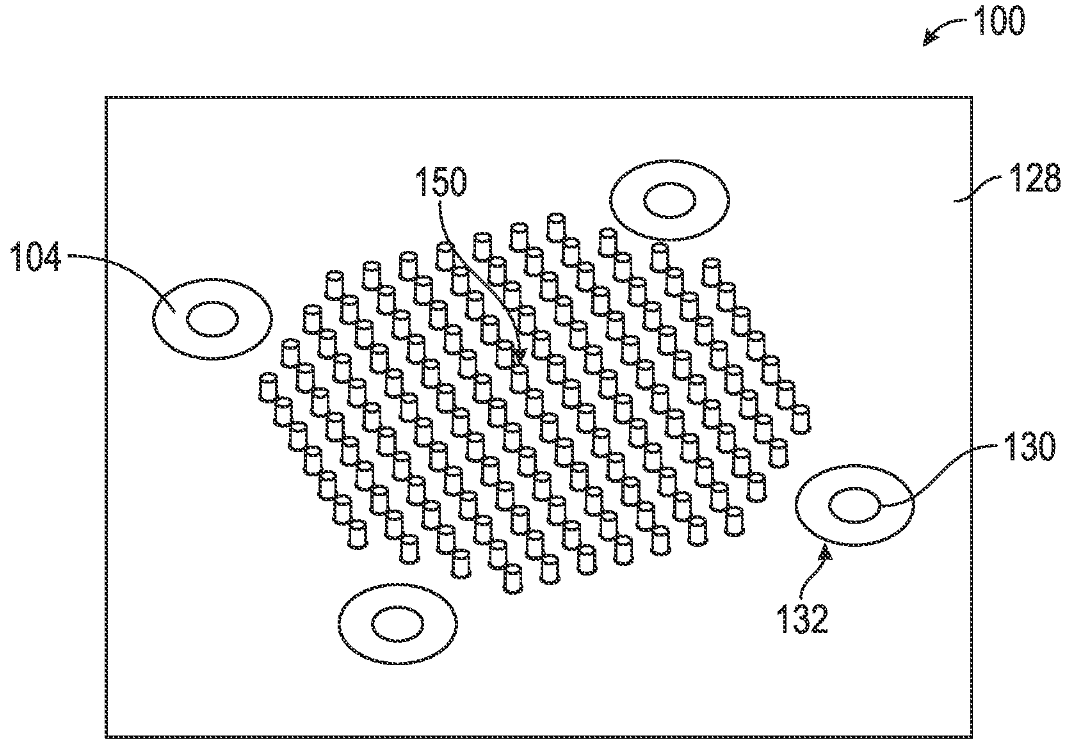
FIG. 4A is a top view of a foundation of the PCBA EMI shielding assembly of FIG. 2 associated with a PCBA, in accordance with an embodiment of the invention.
Figure 4B:
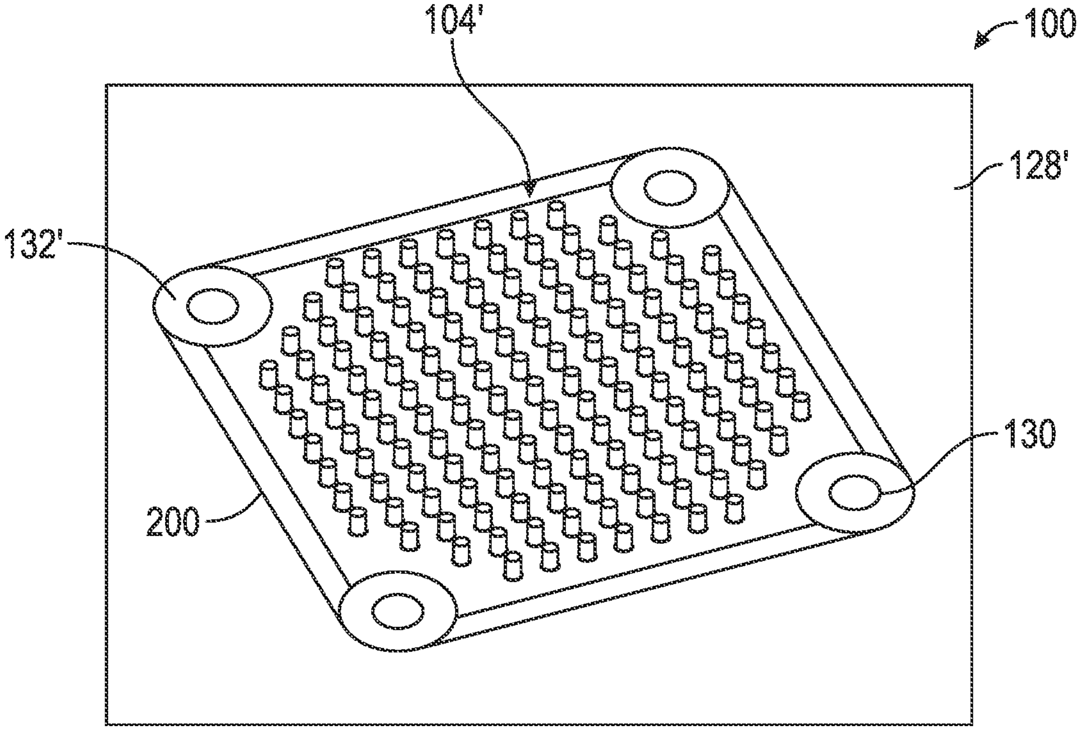
FIG. 4B is a top view of a foundation of the PCBA EMI shielding assembly of FIG. 2 associated with a PCBA, in accordance with another embodiment of the invention.

In accordance with an embodiment and referring to FIG. 4A, the PCBA 128 defines a plurality of PCBA mounting cavities 130 each of which are sized and shaped to contain the mounting device 126. The foundation 104 is associated with and/or fabricated into the PCBA 128, in accordance with an embodiment. The foundation 104 includes a plurality of mounting interfaces 132 which are constructed from a conductive material and which are configured to be connected to a ground potential. Moreover, each of the plurality of mounting interfaces 132 are associated with a PCBA mounting cavity 130, wherein the mounting interface 132 may or may not surround (wholly or partially) the opening to the PCBA mounting cavity 130. Referring to FIG. 4B, it should be appreciated that in another embodiment, the foundation 104' may include one or more foundation (conductive metal) traces 200 which may be associated with and/or fabricated into the PCBA 128' to at least electrically connect and/or partially extend between each of the mounting interfaces 132'. It is contemplated that in other embodiments, the PCBA 128 may be modified to includes a conductive foundation 104 in a retrofit fashion.

Figure 5A:
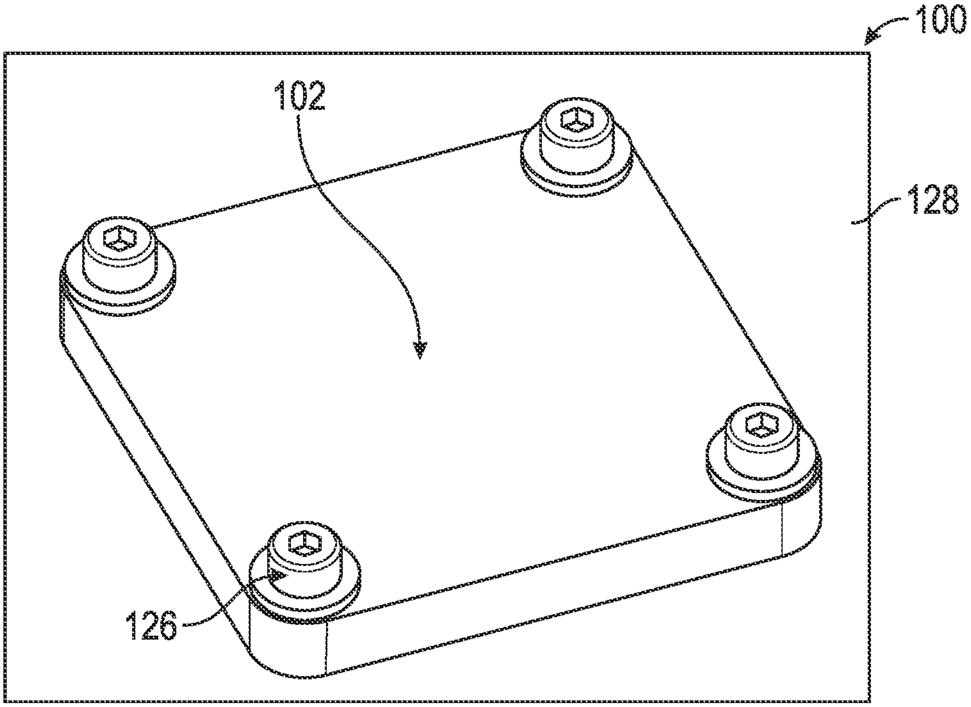
FIG. 5A is a top perspective view of a connector with mounting feet connected to a PCBA implementing the PCBA EMI shielding assembly, in accordance with an embodiment of the invention.
Figure 5B:
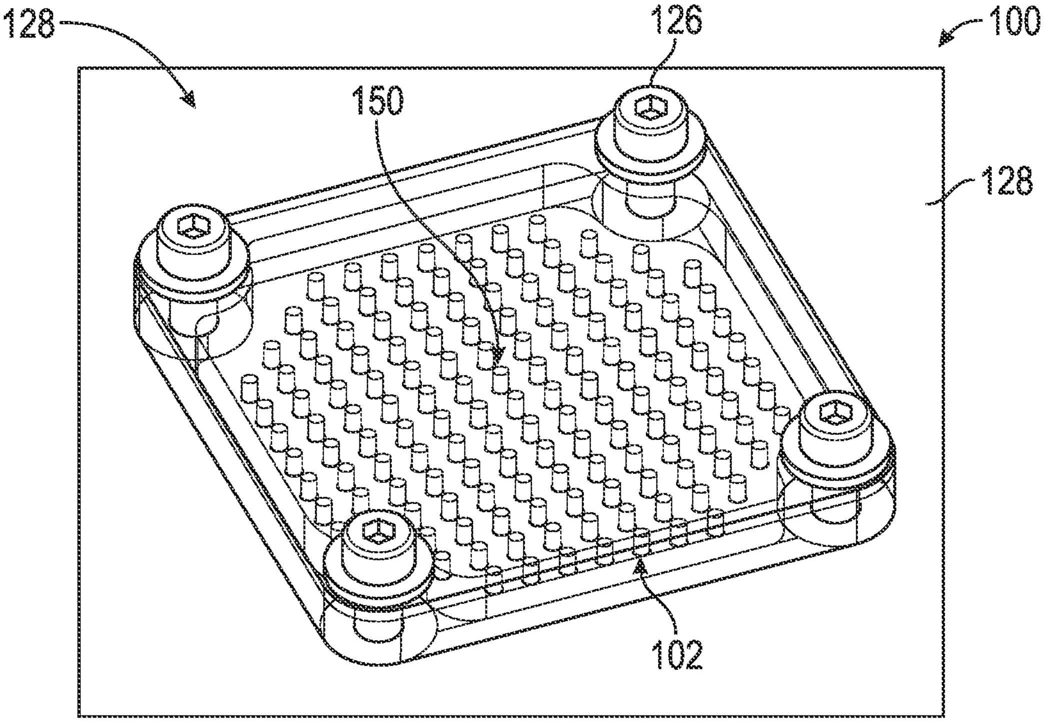
FIG. 5B is a top transparent view of a connector with mounting feet connected to a PCBA implementing the PCBA EMI shielding assembly, in accordance with an embodiment of the invention.
Figure 6A:
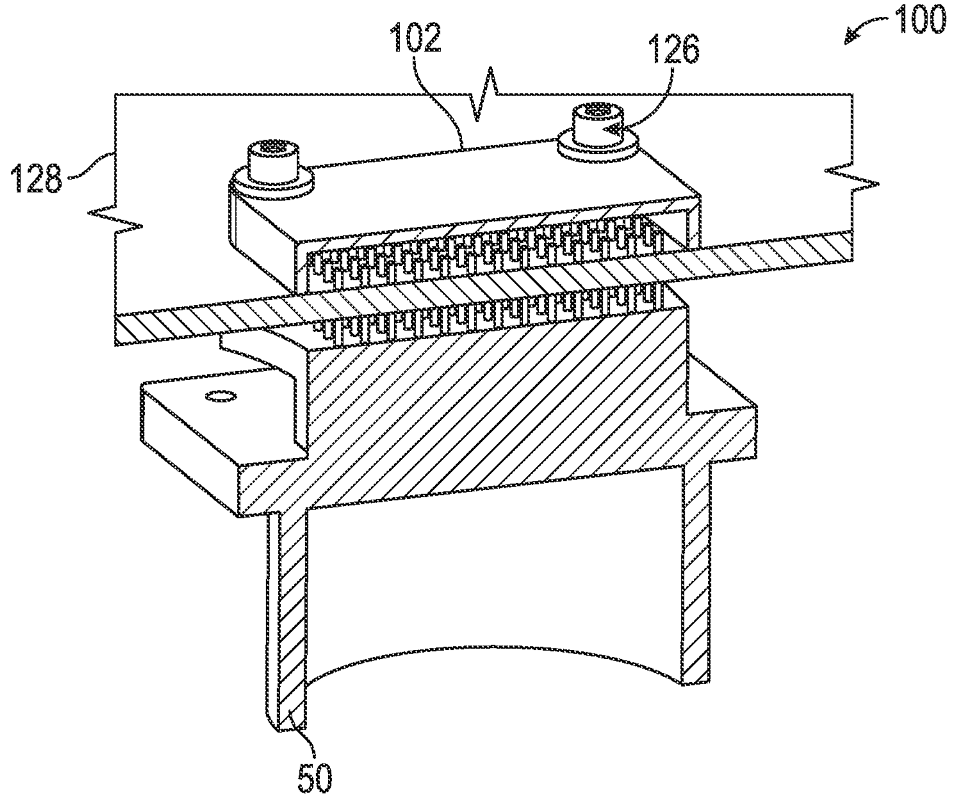
FIG. 6A is a side perspective sectional view of a connector with mounting feet connected to a PCBA implementing the PCBA EMI shielding assembly, in accordance with an embodiment of the invention.
Figure 6B:
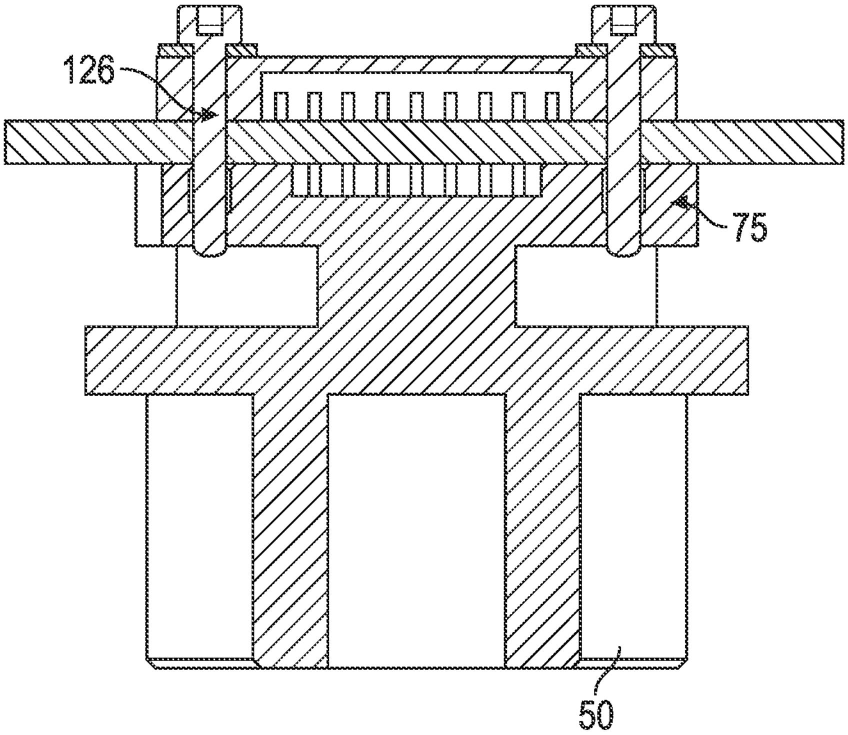
FIG. 6B is a side view of a connector with mounting feet connected to a PCBA implementing the PCBA EMI shielding assembly, in accordance with an embodiment of the invention.

Referring to FIG. 5A, FIG. 5B, FIG. 6A, FIG. 6B and again to FIG. 4A, the plurality of mounting interfaces 132 are arranged and located such that they surround a PCBA area of interest, such as connector pin field 150 which is susceptible to EMI. Moreover, the enclosure 102 and the enclosure cavity 120 is sized and shaped such that the enclosure mounting cavities 124 align with the PCBA mounting cavities 130 and such that the connector pin field 150 fits within the enclosure cavity 120. Accordingly, when a connector 50 is securely associated with a PCBA 128 such that the connector pin field 150 is protruding from the PCBA 128, the enclosure 102 is disposed such that the enclosure interface surfaces 125 are aligned with and contacting the mounting interfaces 132. Mounting devices 126 are located within each enclosure mounting cavity 124 and the associated PCBA mounting cavity 130. The mounting devices 126 are secured to the connector 50 (such as by a nut or screw) to securely associate the enclosure 102, the PCBA 128 and the connector 50 together.

It should be appreciated that in an embodiment the enclosure 102 may be constructed from a ferrite material which acts to shield the connector pin field 150 from EMI. Additionally, each of the sidewall bottom surfaces 122 may include a conductive coating and/or the foundation 104 may be constructed from a conductive material (i.e., copper, etc.) that is configured to be conductively connected to a local or system ground potential.

Figure 7:
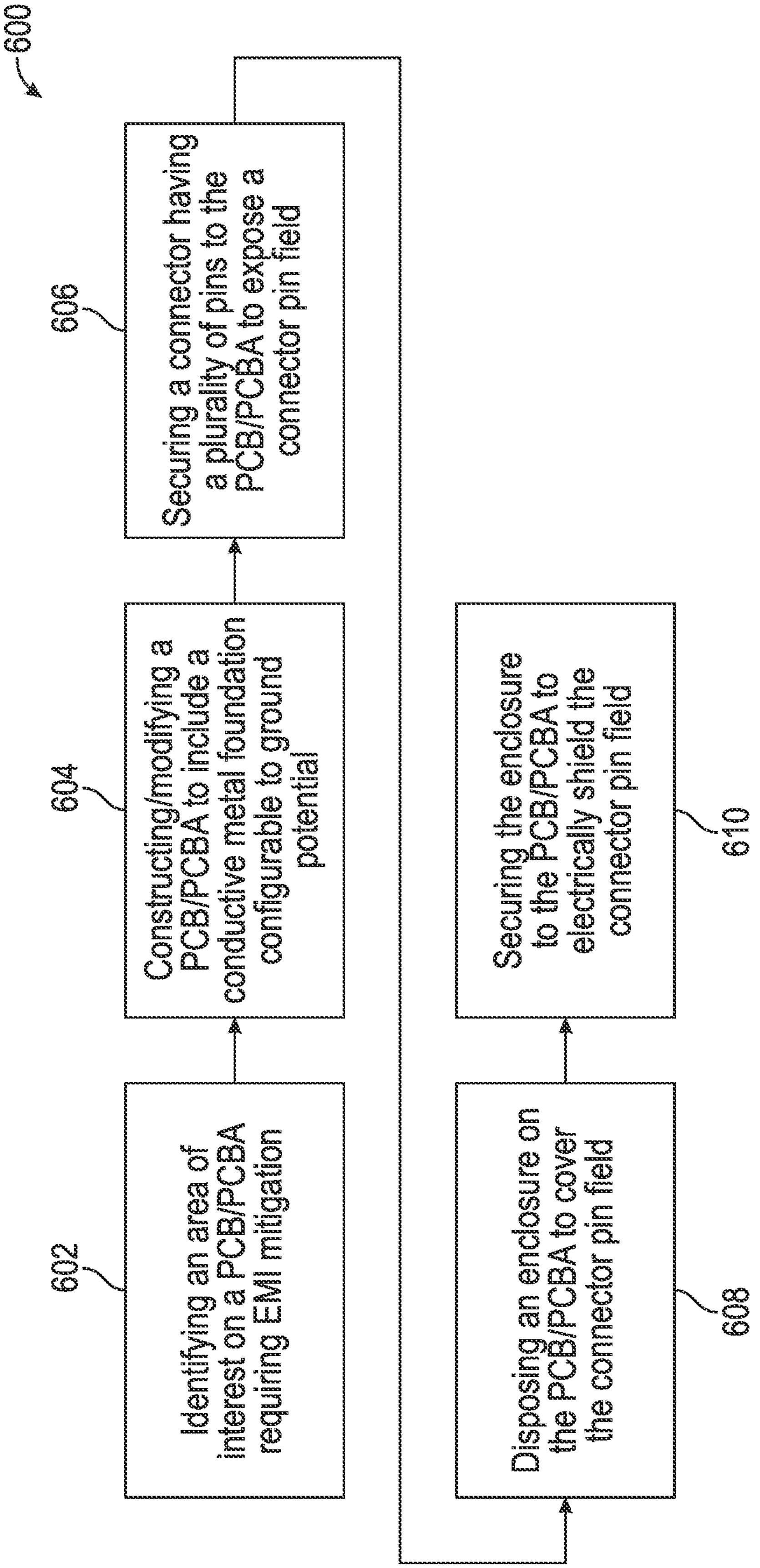
FIG. 7 is an operational block diagram illustrating a method of implementing a PCBA EMI shielding assembly to shield an area of interest on a circuit board, in accordance with an embodiment of the invention.

Referring to FIG. 7, an operational block diagram illustrating one embodiment of a method 600 for shielding an area of interest on a PCBA, such as a connector pin field 150, is provided and includes identifying an area of interest on a PCBA design to be shielded from EMI, as shown in operational block 602. The PCBA 128 is constructed to include a foundation 104 which has a footprint that at least partially surrounds area of interest, as shown in operational block 604. As discussed hereinabove, the foundation 104 may include a plurality of mounting interfaces 132 which are constructed from a conductive material and which are configured to be connected to a local and/or system ground potential. In another embodiment, the foundation 104 may also include conductive metal traces 200 that conductively connect the plurality of mounting interfaces 132 together. A connector 50 having a plurality of connector pins is securely associated with the PCBA 128 wherein the plurality of connector pins are located and exposed within the connector pin field 150, as shown in operational block 606.

An enclosure 102, having the same footprint as the foundation 104, is located on the PCBA 128 to cover the connector pin field 150, as shown in operational block 608. The enclosure 102 is located on the PCBA 128 such that the connector pin field 150 is located within the enclosure cavity 120 and such that enclosure interface surfaces 125 are aligned with and contact the mounting interfaces 132. The enclosure 102 is securely connected to the PCBA 128 via mounting devices 126, as shown in operational block 610. The enclosure 102 is securely connected to the PCBA 128 such that the sidewall bottom surfaces 122 and the enclosure interface surfaces 125 are compressingly in contact with the foundation 104 to create a seal between the enclosure 102 and the PCBA 128.

It should be appreciated that PCBA EMI shielding assembly 100 provides for a localized shield component to protect board-side connector pins from EMI threats and utilizes existing connector envelopes, mounting features and hardware. Moreover, the PCBA EMI shielding assembly 100 of the invention provides for EMI shielding of the connector pin field while providing physical protection of connector pin field using the existing connector board footprint and mounting provisions. Additionally, the invention allows for the interfacing with existing board grounding surfaces (e.g. wagon wheels, copper moating) and can be made from alternate materials to shield against different EMI field types. Furthermore, the invention eliminates the need for additional shielding features on neighboring components and PCBAs, and requires no additional hardware for installation, utilizes existing connector hardware. Moreover, the present invention provides the ability to retrofit existing designs while allowing for a common, scalable design solution for various connector sizes and shapes.

The term “about” is intended to include the degree of error associated with measurement of the particular quantity based upon the equipment available at the time of filing the application. It should be appreciated that although the invention is disclosed herein with regards to a PCBA (i.e., a PCB containing components), the invention is also applicable to a PCB (i.e., an unpopulated printed circuit board) being prepared for population with components. For example, a newly designed PCB may be designed having mounting interfaces 132, 132', mounting cavities 130, an electrically conductive foundation 104, 104' and/or conductive metal traces 200.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. An Electromagnetic Interference (EMI) Shielding Assembly (EISA) for a Printed Circuit Board Assembly (PCBA), comprising:

an enclosure, wherein the enclosure defines an enclosure cavity; and an electrically conductive foundation associated with a PCBA having an area of interest at a first side of the PCBA, wherein the electrically conductive foundation at least partially surrounds the area of interest, and wherein the enclosure is securely connected to the first side of the PCBA to completely cover the area of interest and to contact the electrically conductive foundation;

wherein when a connector is installed to a second side of the PCBA opposite the first side, a connector pin field extends from the connector and through the PCBA such that the connector pin field protrudes from the first side at least partially defining the area of interest.

2. The EISA of claim 1, wherein the area of interest is contained within the enclosure cavity.

3. The EISA of claim 1, wherein the enclosure is constructed from an electromagnetic shielding material.

4. The EISA of claim 1, wherein the enclosure is constructed from a ferrite material.

5. The EISA of claim 1, wherein the electrically conductive foundation includes a plurality of mounting surfaces located along a perimeter of the area of interest.

6. The EISA of claim 5, wherein the electrically conductive foundation further includes at least one conductive metal trace which is located along the perimeter of the area of interest and which conductively connects the plurality of mounting surfaces.

7. The EISA of claim 5, wherein at least one of the plurality of mounting surfaces is configured to be connected to a ground potential.

8. The EISA of claim 1, wherein the enclosure cavity includes a cavity height, a cavity width and a cavity length, and wherein the cavity height, cavity width and cavity length are sized to completely enclose and contain the connector pin field.

9. An Electromagnetic Interference (EMI) Shielding Assembly (EISA) for a Printed Circuit Board Assembly (PCBA), comprising:

an enclosure, wherein the enclosure defines an enclosure cavity; and a PCBA, wherein the PCBA includes a connector pin field protruding from a first side of the PCBA, which includes at least one connector pin and which is external to the PCBA, and an electrically conductive foundation associated with the PCBA to at least partially surround the connector pin field, wherein the enclosure is securely connected to the first side of the PCBA to contact the electrically conductive foundation and to completely contain the connector pin field within the enclosure cavity;

wherein when a connector is installed to a second side of the PCBA opposite the first side, the connector pin field extends from the connector through the PCBA and protrudes from the first side.

10. The EISA of claim 9, wherein the enclosure is constructed from an electromagnetic shielding material.

11. The EISA of claim 9, wherein the enclosure is constructed from a ferrite material.

12. The EISA of claim 9, wherein the electrically conductive foundation includes a plurality of mounting surfaces located along a perimeter of the connector pin field.

13. The EISA of claim 12, wherein the electrically conductive foundation further includes a plurality of conductive metal traces which are located along the perimeter of the connector pin field and which conductively connect the plurality of mounting surfaces.

14. The EISA of claim 12, wherein at least one of the plurality of mounting surfaces is configured to be connected to a ground potential.

15. The EISA of claim 9, wherein the enclosure cavity includes a cavity height, a cavity width and a cavity length, and wherein the cavity height, cavity width and cavity length are sized to completely enclose and contain the connector pin field.

16. A method for shielding an area of interest on a Printed Circuit Board Assembly (PCBA) from EMI, the method comprising:

identifying an area of interest on a first side of a PCBA design to be shielded from EMI, wherein the first side of the PCBA includes a conductive foundation configurable to a ground potential and surrounding the area of interest;

locating a shielding enclosure on the first side of the PCBA to completely cover the area of interest and to be in contact with the conductive foundation; and securing the shielding enclosure to the PCBA to electromagnetically seal the area of interest within the shielding enclosure;

wherein when a connector is installed to a second side of the PCBA opposite the first side, a connector pin field extends from the connector and through the PCBA such that the connector pin field protrudes from the first side at least partially defining the area of interest.

17. The method of claim 16, wherein the conductive foundation includes conductive mounting interfaces and, wherein securing includes securing the shielding enclosure with at least one mounting device to be in contact with the conductive mounting interfaces.

18. The method of claim 17, wherein the conductive foundation includes an electrically conductive trace which surrounds at least a portion of the area of interest.

* * * * *